US008704706B2

United States Patent
Marui et al.

(10) Patent No.: US 8,704,706 B2
(45) Date of Patent: Apr. 22, 2014

(54) RADAR RETURN SIGNAL PROCESSING APPARATUS AND METHOD

(75) Inventors: Hideki Marui, Kawasaki (JP); Toshihisa Tanaka, Fuchu (JP); Satoshi Kon, Fuchu (JP); Fumihiko Mizutani, Kawasaki (JP); Masakazu Wada, Kawasaki (JP); Hiroshi Ishizawa, Kawasaki (JP)

(73) Assignees: Kabushiki Kaisha Toshiba, Tokyo (JP); Tokyo University of Agriculture and Technology, a National University Corporation of Japan, Fuchu-shi (JP)

( * ) Notice: Subject to any disclaimer, the term of this patent is extended or adjusted under 35 U.S.C. 154(b) by 343 days.

(21) Appl. No.: 13/036,608

(22) Filed: Feb. 28, 2011

(65) Prior Publication Data

US 2011/0304501 A1 Dec. 15, 2011

(30) Foreign Application Priority Data

Jun. 11, 2010 (JP) ................................. 2010-134436
Nov. 22, 2010 (JP) ................................. 2010-260631
Nov. 22, 2010 (JP) ................................. 2010-260632

(51) Int. Cl.
*G01S 13/00* (2006.01)

(52) U.S. Cl.
USPC ........................................ 342/192; 342/26 R

(58) Field of Classification Search
USPC .................................................. 342/26, 192
See application file for complete search history.

(56) References Cited

U.S. PATENT DOCUMENTS

| 4,268,828 | A |   | 5/1981  | Cribbs et al. |
|-----------|---|---|---------|----------------|
| 5,262,782 | A |   | 11/1993 | Rubin et al. |
| 5,359,330 | A |   | 10/1994 | Rubin et al. |
| 6,140,954 | A | * | 10/2000 | Sugawara et al. ............... 342/70 |
| 6,539,291 | B1|   | 3/2003  | Tanaka et al. |
| 2009/0033542 | A1 | | 2/2009 | Venkatachalam et al. |

FOREIGN PATENT DOCUMENTS

| JP | 05-027018     | 2/1993 |
| JP | 63-196881     | 8/1998 |
| JP | 2002-257933 A | 9/2002 |
| JP | 2003-344556   | 12/2003 |
| JP | 2006-108533   | 4/2006 |
| JP | 2006-292476   | 10/2006 |
| JP | 3745275       | 12/2006 |
| JP | WO 2009/045618 | 4/2009 |

OTHER PUBLICATIONS

Masahito Ishihara, "Principle and Basics of Doppler Meteorologic Radar", Meteorologic Research Note, Japan Weather Association, No. 200, 2001, pp. 1-38 (with partial English-language translation).

(Continued)

*Primary Examiner* — Timothy A Brainard
(74) *Attorney, Agent, or Firm* — Oblon, Spivak, McClelland, Maier & Neustadt, L.L.P.

(57) ABSTRACT

According to one embodiment, a radar return signal processing apparatus includes a detector, an estimation unit and an extraction unit. The detector detects an average Doppler frequency, a spectrum width, and a received power of each of echoes, from a radar return signal obtained repeatedly at regular intervals. The estimation unit estimates an optimum mixed density function by learning modeling a shaped of the frequency spectrum by calculating repeatedly a sum of density functions of each of the echoes. The extraction unit extracts information on any one of the echoes included in the radar return signal, from a parameter of the estimated mixed density function.

12 Claims, 4 Drawing Sheets

(56) References Cited

OTHER PUBLICATIONS

Shoichiro Fukao et al., "Weather and Atmospheric Radar Remote Sensing," ISBN4-87698-653-3, Mar. 30, 2005, 1 page.
Extended European Search Report issued on Sep. 20, 2011 in corresponding European Application No. 11250232.3.
Office Action issued May 15, 2013 in European Patent Application No. 11 250 232.3.
D. Bocchiola, "Use of Scale Recursive Estimation for assimilation of precipitation data from TRMM (PR and TMI) and NEXRAD", Advances in Water Resources, XP022228757A, vol. 30, No. 11, Sep. 2007, pp. 2354-2372.
Office Action mailed on Jan. 28, 2014, in Japanese Patent Application No. 2010-260631 (with English-language translation).
Office Action mailed on Jan. 28, 2014, in Japanese Patent Application No. 2010-260632 (with English-language translation).
Kon, Satoshi. "Signal Analysis by Mixture Model for Doppler Weather Radar," The Institute for Electronics, Information, and Communication Engineers, IEICE Technical Report, vol. 110, No. 89. (Jun. 2010), pp. 75-80. (With English Abstract).

* cited by examiner

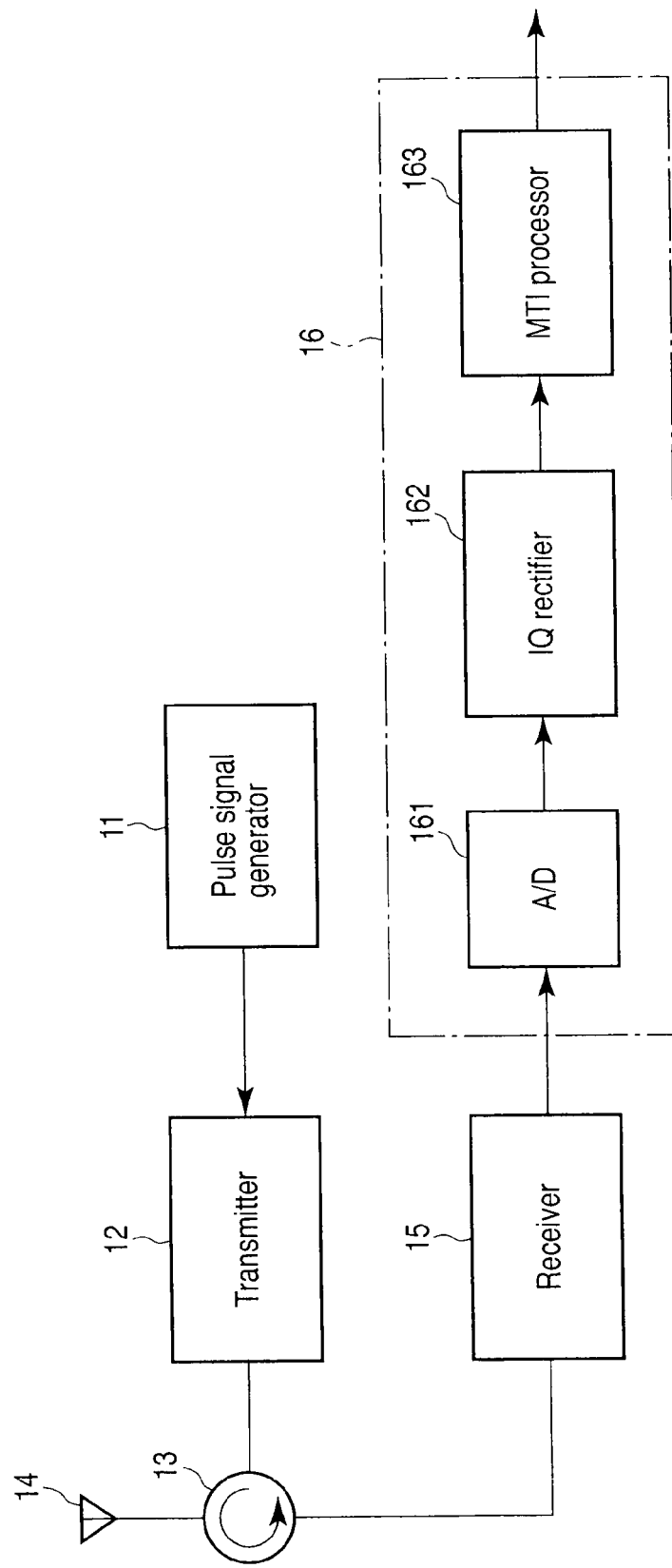
F I G. 1

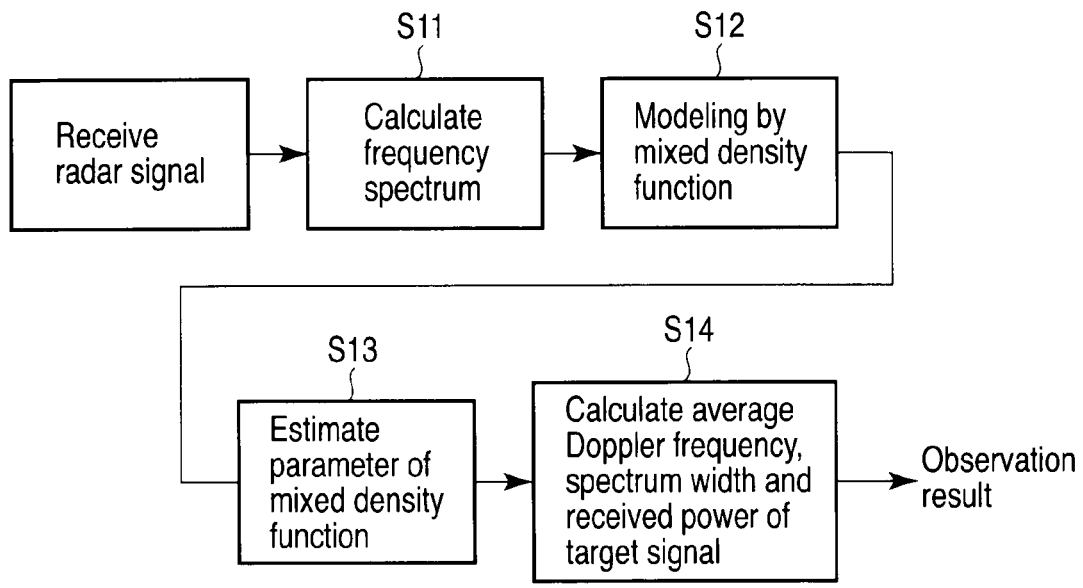
F I G. 2
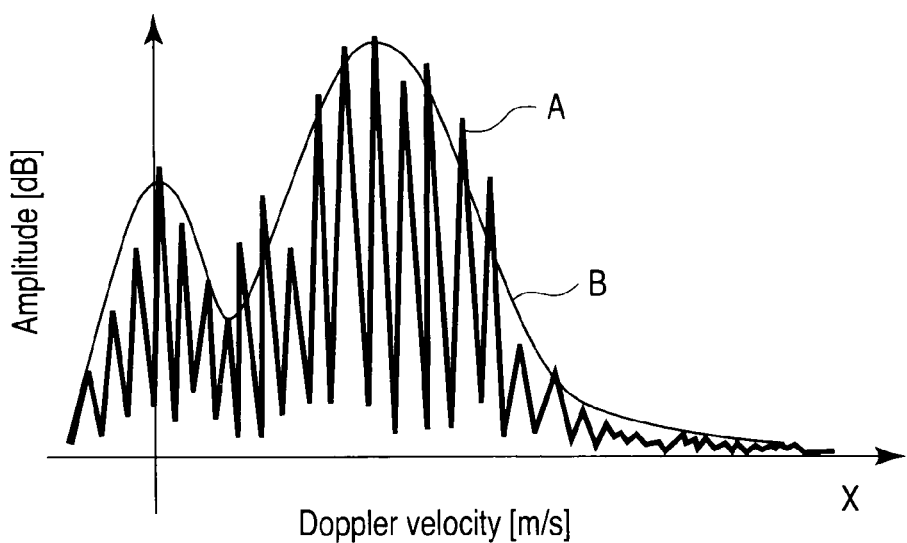
F I G. 3

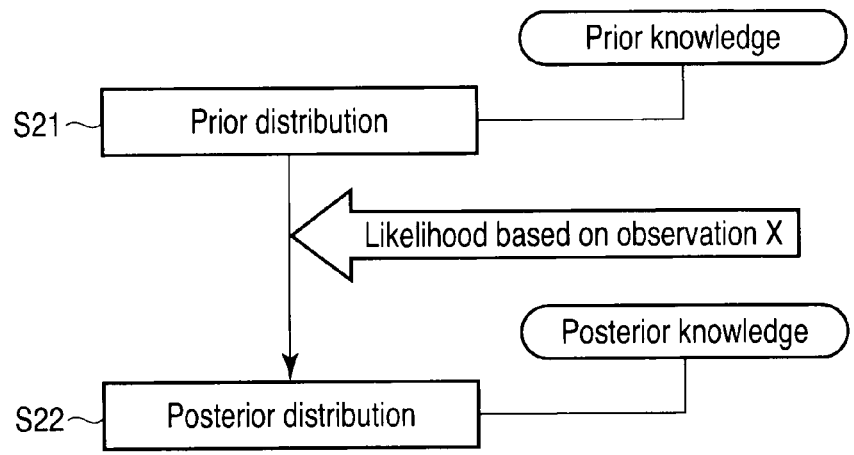
F I G. 4
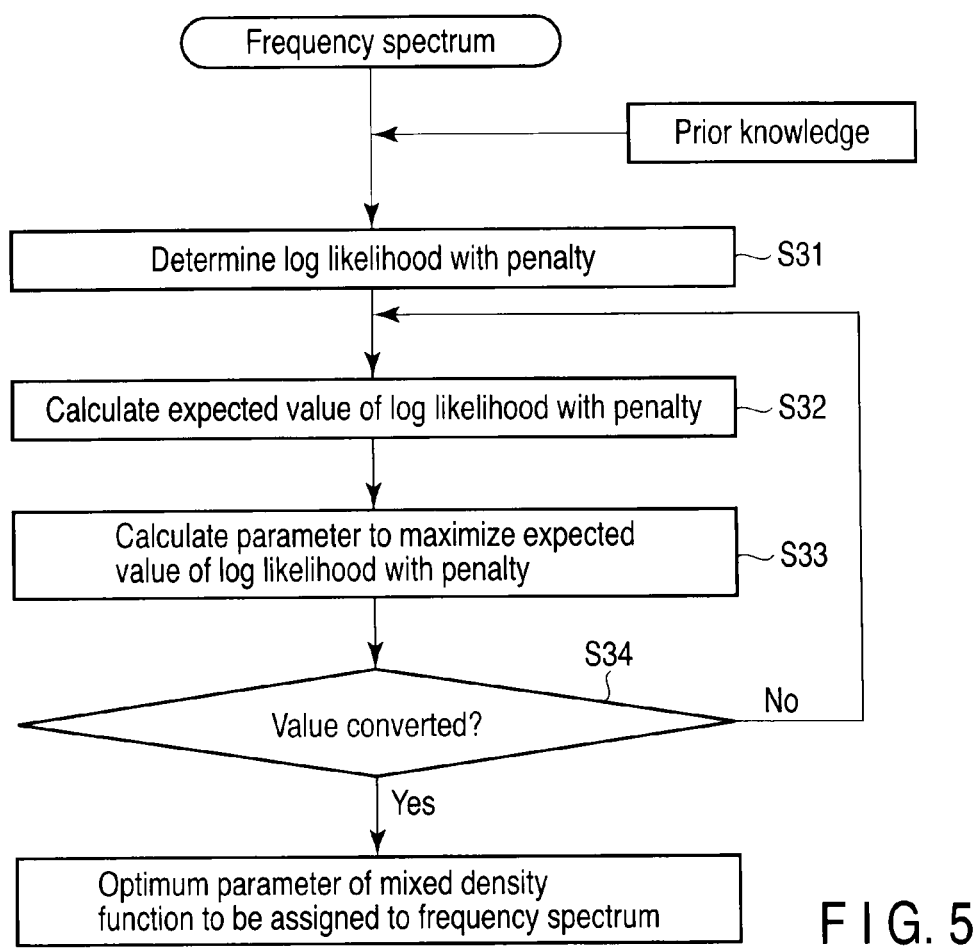
F I G. 5 ained repeatedly at regular intervals. The estimation unit estimates an optimum mixed density function by learning modeling a shape of the frequency spectrum by calculating repeatedly a sum of density functions of each of the echoes. The extraction unit extracts information on any one of the echoes included in the radar return signal, from a parameter of the estimated mixed density function.

RADAR RETURN SIGNAL PROCESSING APPARATUS AND METHOD

CROSS-REFERENCE TO RELATED APPLICATIONS

This application is based upon and claims the benefit of priority from Japanese Patent Applications No. 2010-134436, filed Jun. 11, 2010; No. 2010-260631, filed Nov. 22, 2010; and No. 2010-260632, filed Nov. 22, 2010; the entire contents of all of which are incorporated herein by reference.

1. Field

Embodiments described herein relate generally to a radar return signal processing apparatus and method, which accurately detect a target signal only from a radar return signal containing both target signal and clutter signal.

2. Background

A weather radar observes precipitation by receiving an echo from a weather target, and analyzing received power. Weather radar exploits the Doppler effect exhibited by an electromagnetic wave to determine wind velocity by analyzing the Doppler frequency of a radar return signal. Similarly, surveillance radar detects an aircraft by receiving and processing an echo from the aircraft.

Radar return signals include clutter consisting of echoes from ground, mountains and sea, in addition to target signals. As clutter interferes with observation, a radar return signal processing apparatus uses a moving target indicator (MTI) to eliminate clutter.

A moving target indicator eliminates a clutter signal by means of a low-pass filter with a preset cutoff frequency, by using the difference between the frequency changes in a target signal and clutter signal. Therefore, signal components lower than the preset cutoff frequency are eliminated without discriminating a target signal from a clutter signal.

For example, in weather radar, when a meteorological echo and clutter have an equivalent frequency change, it is impossible to accurately eliminate the clutter signal only, and it is impossible to accurately observe precipitation and wind velocity.

As described above, in a conventional radar return signal processing apparatus, when a target signal and clutter signal have an equivalent frequency change, it is impossible to accurately discriminate a target signal from the clutter signal, and the target signal may be eliminated.

BRIEF DESCRIPTION OF THE DRAWINGS

FIG. 1 is a block diagram showing a configuration of a weather radar signal processing apparatus adopting a radar return signal processing apparatus according to an embodiment;

FIG. 2 is a flowchart of calculating an average Doppler frequency, spectrum width, and received power of a target signal from a radar return signal, in a radar return signal processing apparatus according to an embodiment;

FIG. 3 shows a waveform for modeling a frequency spectrum of a radar return signal by a mixed density function, in the embodiment;

FIG. 4 is a flowchart of estimating an optimum parameter of a mixed density function by using prior knowledge, in the embodiment;

FIG. 5 is a flowchart of estimating an optimum parameter of a mixed density function, in the embodiment.

DETAILED DESCRIPTION

Figure 6:
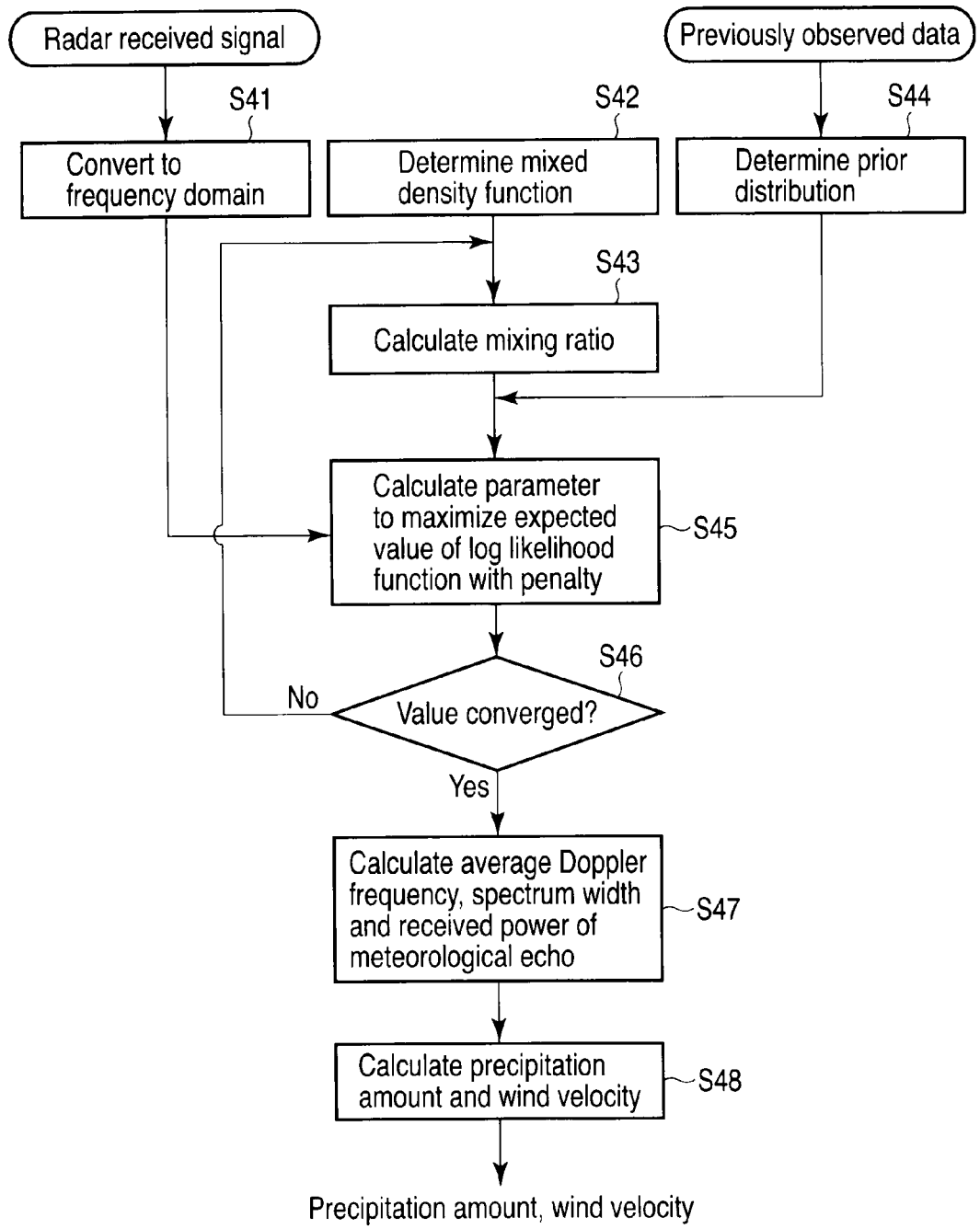
FIG. 6 is a flowchart of calculating precipitation and wind velocity from a radar return signal, in the embodiment.

In general, according to one embodiment, a radar return signal processing apparatus includes an acquisition unit, an estimation unit and an extraction unit. The acquisition unit acquires a frequency spectrum determined by an average Doppler frequency, spectrum width, and received power of each echo group, from a radar return signal obtained repeatedly at regular intervals. The estimation unit estimates an optimum mixed density function by learning modeling a shape of the frequency spectrum by calculating repeatedly a sum of density functions of each of the echoes. The extraction unit extracts information on any one of the echoes included in the radar return signal, from a parameter of the estimated mixed density function.

Hereinafter, embodiments will be explained with reference to the accompanying drawings.

FIG. 1 is a block diagram showing a configuration of a weather radar signal processing apparatus adopting a radar return signal processing apparatus according to an embodiment. In FIG. 1, a radar pulse signal generated by a pulse signal generator 11 is frequency converted and power amplified by a transmitter 12, and the signal is radiated to space from an antenna 14 through a circulator 13.

A reflected signal of a radar wave received by the antenna 14 is sent to a receiver 15 through the circulator 13. The receiver 15 amplifies the signal received by the antenna 14, and converts the frequency to a baseband. The output of the receiver 15 is sent to a radar return signal processor 16.

The radar return signal processor 16 digitizes the input radar return signal into by means of an analog-to-digital converter 161, converts the digital data into complex IQ data by means of an IQ detector 162, and obtains observation data based on a meteorological echo by eliminating a terrestrial echo component by means of an observation processor 163.

FIG. 2 is a flowchart of calculating an average Doppler frequency, spectrum width, and received power of a target signal (meteorological echo component) from a radar return signal (IQ data), in the observation processor 163.

First, a frequency spectrum is obtained by converting a radar return signal into a frequency domain (step S11). Then, the obtained frequency spectrum is modeled by a mixed density function (step S12). An optimum parameter of the mixed density function is estimated by learning (step S13). An average Doppler frequency, spectrum width, and received power of a target signal are calculated from the estimated parameter, and output as an observation result (step S14).

FIG. 3 shows a waveform for modeling a frequency spectrum by a mixed density function, in step S12. A symbol A indicates a frequency spectrum, and B indicates a mixed density function. In FIG. 3, the horizontal axis X represents Doppler velocity (m/s), and the vertical axis Y represents amplitude (dB). First, a mixed density function for modeling a frequency spectrum is given. The mixed density function is expressed by the sum of density functions of echoes, and the parameter is a value associated with a mixing ratio of each echo and a spectrum shape.

Prior knowledge may be used for estimating an optimum parameter of a mixed density function corresponding to the frequency spectrum. FIG. 4 shows a flowchart of estimating an optimum parameter of a mixed density function by using prior knowledge.

In FIG. 4, first, a parameter of a density function of each echo is assumed to be a variable according to prior knowledge, and a prior distribution to be followed is determined by statistical nature (step S21). Posteriori distribution is calculated from the determined prior distribution and likelihood based on observation, and an optimum parameter of a mixed density function is obtained by maximizing the posteriori distribution (step S22).

FIG. 5 is a flowchart of estimating an optimum parameter of a mixed density function by maximizing the posteriori distribution. First, a likelihood function with a penalty is determined by using a frequency spectrum and prior knowledge (step S31). Then, an expected value of a log likelihood function with a penalty is calculated from the determined likelihood function with a penalty (step S32). A parameter to maximize an expected value of a log likelihood function with a penalty is calculated (step S33). Next, whether the parameter value is converged is determined (step S34). If the parameter value is not converged, step S32 is resumed. In other words, the procedure is repeated from step of calculating an expected value of a log likelihood function with a penalty by using a parameter to maximize an expected value, until the parameter value is converged. The converged parameter value is assumed to be an optimum parameter of a mixed density function for modeling the frequency spectrum of a radar return signal.

(Embodiment 1)

FIG. 6 shows an example of using the above embodiment in a weather radar signal processing apparatus, and is a flowchart of calculating precipitation and wind velocity from a radar return signal.

In FIG. 6, first, a radar return signal is converted into a frequency domain, and an amplitude component $y_i$ of a frequency spectrum is obtained (step S41). Then, a mixed density function for modeling the obtained frequency spectrum is given (step S42). Here, as a distribution for modeling a clutter signal (ground echo component), a normal distribution $f_1(x|\theta_1)$ used in the following equation (1) is used. In the equation (1), X indicates Doppler velocity. $\theta = \tau_1, \tau_2, \theta_{11}, \theta_{12}, \theta_{21}, \theta_{22}$ indicates a parameter of a mixed density function, and an initial value is optionally set.

$$f_1(x|\theta_1) = (2\pi\theta_{12})^{-1/2} \exp\{-(x-\theta_{11})^2/(2\theta_{12})\} \tag{1}$$

A Von-Mises distribution $f_2(x|\theta_2)$ expressed by the following equation (2) is used as a distribution for modeling a meteorological echo.

$$f_2(x|\theta_2) = \exp\{\theta_{22} \cos(x-\theta_{21})\}/\{2\pi I_0(\theta_{22})\} \tag{2}$$

$I_0$ indicates a 0-order correction Bessel function.

Based on the equations (1) and (2), a mixed density function $f(x|\theta)$ for modeling a frequency spectrum is expressed by the following equation (3).

$$f(x|\theta) = \tau_1 f_1(x|\theta_1) + \tau_2 f_2(x|\theta_2) \tag{3}$$

Then, mixing ratios $T_{1,i}$ and $T_{2,i}$ are calculated from the given mixed density function by the following equations (4) and (5) (step S43).

$$T_{1,i} = \tau_1 f_1(x_i|\theta_1)/\{f(x|\theta)\} \tag{4}$$

$$T_{2,i} = \tau_2 f_2(x_i|\theta_2)/\{f(x|\theta)\} \tag{5}$$

Next, a prior distribution is determined from previously observed data (step S44). First, a parameter associated with the power of a clutter signal follows a beta distribution $p1(\tau_1)$ expressed by the following equation (6).

$$p_1(\tau_1) = \{\tau_1^{\alpha-1}(1-\tau_1)^{\beta-1}\}/B(\alpha,\beta) \tag{6}$$

$B(\alpha,\beta)$ indicates a beta function.

A parameter associated with a Doppler frequency of a clutter signal follows a normal distribution $p_2(\theta_{11})$ expressed by the following equation (7).

$$p_2(\theta_{11}) = (2\pi\phi_2)^{-1/2} \exp\{-(\theta_{11}-\phi_1)^2/(2\phi_2)\} \tag{7}$$

A parameter associated with a spectrum width of a clutter signal follows a gamma distribution $p_3(\theta_{12})$ expressed by the following equation (8).

$$p_3(\theta_{12}) = b^{-\theta_{12}a-1} \exp(-\theta_{12}/b)/\Gamma(a) \tag{8}$$

$\Gamma(a)$ indicates a gamma function. Parameters $\alpha, \beta, \phi_1, \phi_2, a, b$ of a prior distribution are determined from the data on a previously observed clutter signal.

Next, $Q(\theta|\theta^{(t)})$ is maximized by partially differentiating an expected value of a log likelihood function with a penalty shown in the equation (8) (step S45).

$$Q(\theta|\theta^{(t)}) = \Sigma^n_{i=1}[y_i T_{1,i}\{\log \tau_1 f_1(\theta_1|x_i)\} + y_i T_{2,i}\{\log \tau_2 f_2(\theta_2|x_i)\}] + S_1 \log\{p_1(\tau_1)\} + S_2 \log\{p_2(\theta_{11})\} + S_3 \log\{p_3(\theta_{12})\} \tag{9}$$

The term n indicates the number of samples for Fourier transformation. The term (t) indicates the number of repetitions of steps S43 and S45. The parameters are updated by the following equations.

$$\tau_1 = \{\Sigma^n_{i=1} y_i T_{1,i} + S_1(\alpha-1)\}/\{\Sigma^n_{i=1} y_i + S_1(\alpha+\beta-2)\} \tag{10}$$

$$\tau_2 = 1 - \tau_1 \tag{11}$$

$$\theta_{11} = \{\Sigma^n_{i=1} y_i T_{1,i} x_i + S_2(\phi_1 \theta_{12}/\phi_2)\}/\{\Sigma^n_{i=1} y_i T_{1,i} + S_2(\theta_{12}/\phi_2)\} \tag{12}$$

$$\theta_{12} = (1-S_3)\{\Sigma^n_{i=1} y_i T_{1,i}(x_i-\theta_{11})^2/\Sigma^n_{i=1} y_i T_{1,i}\} + S_3\{-\Sigma^n_{i=1} y_i T_{1,i} + 2(a-1) + [\{\Sigma^n_{i=1} y_i T_{1,i} - 2(a-1)\}^2 + 8/b\Sigma^n_{i=1} y_i T_{1,i}(x_i-\theta_{11})^2]^{1/2}\}/\{4/b\} \tag{13}$$

$$\theta_{21} = \tan^{-1}\{(\Sigma^n_{i=1} y_i T_{2,i} \sin x_i)/(\Sigma^n_{i=1} y_i T_{2,i} \cos x_i)\} \tag{14}$$

$$I_1(\theta_{22})/I_0(\theta_{22}) = \Sigma^n_{i=1} y_i T_{2,i} \cos(x_i-\theta_{21})/\Sigma^n_{i=1} y_i T_{2,i} \tag{15}$$

As described above, $\theta_{22}$ can be obtained by solving the equation (15). $S_1$, $S_2$ and $S_3$ take 1 or 0. $S_1$ is 1 when the prior knowledge of the power of a clutter signal is used, and $S_1$ is 0 when it is not used. $S_2$ is 1 when the prior knowledge of a Doppler frequency of a clutter signal is used, and $S_2$ is 0 when it is not used. $S_3$ is 1 when the prior knowledge of a spectrum width of a clutter signal is used, and $S_3$ is 0 when it is not used.

Next, whether the parameters calculated by the above equations are converged is determined (step S46). In this step, when the difference between the parameter for calculating a mixing ratio and the updated parameter is 1/1000 or lower, the parameters are judged as being converged. If the difference is higher, steps S43 and S45 are repeated by using the calculated parameters.

When the parameters are judged as being converged, an average Doppler frequency, spectrum wide, and received power of a meteorological echo are calculated from the parameters of the estimated Von-Muses distribution (step S47). Then, precipitation and wind velocity are calculated from the average Doppler frequency, spectrum wide, and received power of the estimated meteorological echo (step S48).

By the above processing, even if a terrestrial echo caused by ground clutter is overlapped with a meteorological echo as a clutter signal, the components of the meteorological echo and terrestrial echo can be accurately estimated, and precipitation and wind velocity can be accurately estimated from the data.

(Embodiment 2)

In the embodiment 1, a frequency spectrum of a return signal is modeled by the sum of two density functions assuming a meteorological echo and a terrestrial echo (ground clutter). A certain effect can be expected by such processing, but an actual return signal includes clutter components such as noise (clutter echo) other than a terrestrial echo. If a frequency spectrum of such a return signal is modeled by the sum of two density functions assuming a meteorological and a terrestrial echo, an error may occur in estimation of a meteorological echo.

In the embodiment 2, a frequency spectrum of a return signal is modeled by the sum of three density functions including a clutter echo such as noise. The embodiment will be explained by referring again to FIG. 6.

In FIG. 6, first, a radar return signal is converted into a frequency domain, and an amplitude component $y_i$ of a frequency spectrum is obtained (step S41). Then, a mixed density function for modeling the obtained frequency spectrum is given (step S42). Here, as a distribution for modeling a clutter signal (ground echo component), a normal distribution $f_1(x|\theta_1)$ used in the following equation (16) is used. In the equation (16), X indicates a Doppler velocity. $\theta = \tau_1, \tau_2, \tau_3, \theta_{11}, \theta_{12}, \theta_{21}, \theta_{22}$ indicates a parameter of a mixed density function, and an initial value is optionally set.

$$f_1(x|\theta_1) = (2\pi\theta_{12})^{-1/2} \exp\{-(x-\theta_{11})^2/(2\theta_{12})\} \quad (16)$$

A Von-Mises distribution $f_2(x|\theta_2)$ expressed by the following equation (17) is used as a distribution for modeling a meteorological echo.

$$f_2(x|\theta_2) = \exp\{\theta_{22} \cos(x-\theta_{21})\}/\{2\pi I_0(\theta_{22})\} \quad (17)$$

$I_0$ indicates a 0-order correction Bessel function.

An even distribution $f_3(x|\theta_3)$ expressed by the following equation (18) is used as a distribution for modeling a clutter echo other than the above.

$$f_3(x|\theta_3) = 1/(2V_{nyq}) \quad (18)$$

$V_{nyq}$ indicates a Nyqist rate.

Based on the equations (16), (17) and (18), a mixed density function $f(x|\theta)$ for modeling a frequency spectrum is expressed by the following equation (19).

$$f(x|\theta) = \tau_1 f_1(x|\theta_1) + \tau_2 f_2(x|\theta_2) + \tau_3 f_3(x|\theta_3) \quad (19)$$

Then, mixing ratios $T_{1,i}$, $T_{2,i}$ and $T_{3,i}$ are calculated from the given mixed density function by the following equations (20), (21) and (22) (step S43).

$$T_{1,i} = \tau_1 f_1(x_i|\theta_1)/\{f(x_i|\theta)\} \quad (20)$$

$$T_{2,i} = \tau_2 f_2(x_i|\theta_2)/\{f(x_i|\theta)\} \quad (21)$$

$$T_{3,i} = \tau_3 f_3(x_i|\theta_3)/\{f(x_i|\theta)\} \quad (22)$$

Next, a prior distribution is determined from previously observed data (step S44). First, a parameter associated with the power of a clutter signal follows a beta distribution $p_1(\tau_1)$ expressed by the following equation.

$$p_1(\tau_1) = \{\tau_1^{\alpha-1}(1-\tau_1)^{\beta-1}\}/B(\alpha,\beta) \quad (23)$$

$B(\alpha,\beta)$ indicates a beta function.

A parameter associated with a Doppler frequency of a clutter signal follows a normal distribution $p_2(\theta_{11})$ expressed by the following equation.

$$p_2(\theta_{11}) = (2\pi\phi_2)^{-1/2} \exp\{-(\theta_{11}-\phi_1)^2/(2\phi_2)\} \quad (24)$$

A parameter associated with a spectrum width of a clutter signal follows a gamma distribution $p_3(\theta_{12})$ expressed by the following equation.

$$p_3(\theta_{12}) = b^{-a}\theta_{12}^{a-1}\exp(-\theta_{12}/b)/\Gamma(a) \quad (25)$$

$\Gamma(a)$ indicates a gamma function. Parameters $\alpha, \beta, \phi_1, \phi_2, a, b$ of a prior distribution are determined from the data on a previously observed clutter signal.

Next, $Q(\theta|\theta^{(t)})$ is maximized by partially differentiating an expected value of a log likelihood function with a penalty shown in the equation (25) (step S45).

$$Q(\theta|\theta^{(t)}) = \Sigma^n_{i=1}[y_i T_{1,i}\{\log \tau_1 f_1(\theta_1|x_i)\} + y_i T_{2,i}\{\log \tau_2 f_2(\theta_2|x_i)\} + y_i T_{3,i}\{\log \tau_3 f_3(\theta_3|x_i)\}] + S_1 \log\{p_1(\tau_1)\} + S_2 \log\{p_2(\theta_{11})\} + S_3 \log\{p_3(\theta_{12})\} \quad (26)$$

The term n indicates the number of samples for Fourier transformation. The term (t) indicates the number of repetitions of steps S43 and S45. The parameters are updated by the following equations.

$$\tau_1 = \{\Sigma^n_{i=1} y_i T_{1,i} + S_1(\alpha-1)\}/\{\Sigma^n_{i=1} y_i + S_1(\alpha+\beta-2)\} \quad (27)$$

$$\tau_2 = \{\Sigma^n_{i=1} y_i T_{2,i} - S_1\tau_1\Sigma^n_{i=1}y_i T_{2,i}\}/\{\Sigma^n_{i=1} y_i (T_{2,i}+S_1 T_{3,i})\} \quad (28)$$

$$\tau_3 = 1 - \tau_1 - \tau_2 \quad (29)$$

$$\theta_{11} = \{\Sigma^n_{i=1} y_i T_{1,i} x_i + S_2(\phi_1\theta_{12}/\phi_2)\}/\{\Sigma^n_{i=1}y_i T_{1,i} + S_2(\theta_{12}/\phi_2)\} \quad (30)$$

$$\theta_{12} = (1-S_3)\{\Sigma^n_{i=1} y_i T_{1,i}(x_i-\theta_{11})^2/\Sigma^n_{i=1} y_i T_{1,i}\} + S_3\{-\Sigma^n_{i=1} y_i T_{1,i} + 2(a-1) + [\{\Sigma^n_{i=1} y_i T_{1,i} - 2(a-1)\}^2 + 8/b\Sigma^n_{i=1} y_i T_{1,i}(x_i-\theta_{11})^2]^{1/2}\}/\{4/b\} \quad (31)$$

$$\theta_{21} = \tan^{-1}\{(\Sigma^n_{i=1} y_i T_{2,i} \sin x_i)/(\Sigma^n_{i=1} y_i T_{2,i} \cos x_i)\} \quad (32)$$

$$I_1(\theta_{22})/I_0(\theta_{22}) = \Sigma^n_{i=1} y_i T_{2,i} \cos(x_i-\theta_{21})/\Sigma^n_{i=1} y_i T_{2,i} \quad (33)$$

$\theta_{22}$ can be obtained by solving the equation (33). $S_1, S_2$ and $S_3$ take 1 or 0. $S_1$ is 1 when the prior knowledge of the power of a clutter signal is used, and $S_1$ is 0 when it is not used. $S_2$ is 1 when the prior knowledge of the Doppler frequency of a clutter signal, and $S_2$ is 0 when it is not used. $S_3$ is 1 when the prior knowledge of the spectrum width of a clutter signal is used, and $S_3$ is 0 when it is not used.

Next, whether the parameters calculated by the above equations are converged is determined (step S46). In this step, when the difference between the parameter for calculating a mixing ratio and the updated parameter is 1/1000 or lower, the parameters are judged as being converged. If the difference is higher, steps S43 and S45 are repeated by using the calculated parameters.

When the parameters are judged as being converged, an average Doppler frequency, spectrum wide, and received power of a meteorological echo are calculated from the parameters of the estimated Von-Muses distribution (step S47). Then, precipitation and wind velocity are calculated from the average Doppler frequency, spectrum wide, and received power of the estimated meteorological echo (step S48).

By the above processing, even if a terrestrial echo caused by ground clutter is overlapped with a meteorological echo as a clutter signal, the components of the meteorological echo and terrestrial echo can be accurately estimated, and precipitation and wind velocity can be accurately estimated from the data.

A weather radar is assumed in the above embodiment. The embodiment is applicable when a target signal is obtained by eliminating a clutter signal from an ordinary radar unit, or a radar return signal. Further, the embodiment is applicable when using a radar unit, which electronically scans a transmission beam, like an active phased array radar, and a radar unit which forms a plurality of received beams by using digital beam forming technology. Therefore, according to the above embodiment, it is possible to provide a radar return signal processing apparatus, which accurately detects a target signal only from a radar return signal containing both target signal and clutter signal having an equivalent frequency change.

As described above, according to the embodiment, a frequency spectrum determined by an average Doppler frequency, spectrum width, and received power of each echo group is acquired from a radar return signal obtained repeatedly at regular intervals, an optimum mixed density function is estimated by learning modeling a shape of the frequency spectrum by calculating repeatedly a sum of density functions of each of the echoes, and information on any one of the echoes is extracted from a parameter of the mixed density function used for the estimation. As result, according to radar the return signal processing apparatus of the constitution, when a target signal and clutter signal have an equivalent frequency change, it is possible to accurately discriminate a target signal from the clutter signal, and it gets impossible to be removed the target signal.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A radar return signal processing apparatus comprising:
   a detector which detects an average Doppler frequency, a spectrum width and a received power of each of echoes included in a radar return signal, from the radar return signal obtained repeatedly at regular intervals and detects a frequency spectrum based on the average Doppler frequency, the spectrum width and the received power;
   an estimation unit which estimates an optimum mixed density function by modeling a shape of the frequency spectrum by calculating repeatedly a sum of density functions of each of the echoes; and
   an extraction unit which extracts information on any one of the echoes included in the radar return signal, from a parameter of the estimated mixed density function.

2. The radar return signal processing apparatus according to claim 1, wherein the detector detects the frequency spectrum by converting the radar return signal into a frequency domain.

3. The radar return signal processing apparatus according to claim 1, wherein the estimation unit estimates a parameter to maximize a likelihood function with a penalty by repeating a procedure of assigning a frequency spectrum comprising the echoes to a mixed density function, evaluating the assignment by the likelihood function with a penalty, calculating a hidden variable of the likelihood function, and maximizing an expected value of the likelihood function with a penalty for each parameter of the mixed density function, until the parameter value is converged.

4. The radar return signal processing apparatus according to claim 3, wherein the estimation unit determines a prior distribution to be followed by each parameter of a mixed density function by statistical nature of the average Doppler frequency, the spectrum width and the received power of each of the echoes, and determines the likelihood function with a penalty by adding the prior distribution to the likelihood function as the penalty.

5. The radar return signal processing apparatus according to claim 4, wherein the estimation unit calculates and determines a statistics value of the prior distribution, by previously observing a single echo of the radar return signal, in the process of determining the prior distribution.

6. The radar return signal processing apparatus according to claim 4, wherein at least one of the received power, the Doppler frequency and the spectrum width of a previously measured single echo is used for the penalty of the likelihood function.

7. The radar return signal processing apparatus according to claim 1, wherein the extraction unit calculates and extracts the average Doppler frequency, the spectrum width and the received power which determine a frequency spectrum of a desired echo, from a parameter of the desired echo out of parameters of the mixed density function estimated by the estimation unit, as information about the desired echo.

8. The radar return signal processing apparatus according to claim 1, wherein when the radar return signal is a weather radar signal, and the echoes comprises a meteorological echo and a terrestrial echo,
   the detector detects an average Doppler frequency, a spectrum width and a received power of a meteorological echo and terrestrial echo, from the radar return signal,
   the estimation unit estimates an optimum mixed density function by modeling a shape of the frequency spectrum by calculating repeatedly a sum of density functions of the meteorological echo and terrestrial echo,
   the extraction unit calculates an average Doppler frequency, spectrum width and received power of the meteorological echo, from a parameter of the estimated mixed density function, and extracts them as information about the meteorological echo, and
   the apparatus further comprises a calculation unit which calculates precipitation and wind velocity from the extracted the average Doppler frequency, the spectrum width and the received power.

9. The radar return signal processing apparatus according to claim 8, wherein the estimation unit estimates a parameter to maximize a likelihood function with a penalty by repeating a procedure of assigning a frequency spectrum comprising the meteorological echo and terrestrial echo to a mixed density function, evaluating the assignment by the likelihood function with a penalty, calculating a hidden variable of the likelihood function, and maximizing an expected value of the likelihood function with a penalty for each parameter of the mixed density function, until the parameter value is converged,
   determines a prior distribution to be followed by each parameter of a mixed density function by statistical nature of the average Doppler frequency, the spectrum width and the received power of each of the echoes, and determines the likelihood function with a penalty by adding the prior distribution to the likelihood function as the penalty, in the process of determining the likelihood function with a penalty, and
   calculates and determines a statistics value by observing a terrestrial echo only at fine weather as a single echo of the radar return signal, and previously observing a range having no terrestrial echo, in the process of determining the prior distribution.

10. The radar return signal processing apparatus according to claim 1, wherein when the radar return signal is a weather radar signal, and the echo group comprises a meteorological echo, a terrestrial echo, and a clutter echo, the detector detects an average Doppler frequency, spectrum width and received power of a meteorological echo, a terrestrial echo, and a clutter echo from the radar return signal and detects a frequency spectrum based on the average Doppler frequency, the spectrum width and the received power, the estimation unit estimates an optimum mixed density function by modeling a shaped of the frequency spectrum by calculating repeatedly a sum of density functions of the meteorological echo and terrestrial echo, the extraction unit calculates an average Doppler frequency, a spectrum width and a received power of the meteorological echo from a parameter of the estimated mixed density function, and extracts them as information about the meteorological echo, and the apparatus further comprises a calculation unit which calculates precipitation and wind velocity from the extracted average Doppler frequency, the spectrum width and the received power.

11. The radar return signal processing apparatus according to claim 10, wherein the estimation unit estimates a parameter to maximize a likelihood function with a penalty by repeating a procedure of assigning a frequency spectrum comprising the meteorological echo, terrestrial echo and clutter echo to a mixed density function, evaluating the assignment by the likelihood function with a penalty, calculating a hidden variable of the likelihood function, and maximizing an expected value of the likelihood function with a penalty for each parameter of the mixed density function, until the parameter value is converged, determines a prior distribution to be followed by each parameter of a mixed density function by statistical nature of an average Doppler frequency, spectrum width and received power of each of the echoes, and determines the likelihood function with a penalty by adding the prior distribution to the likelihood function as the penalty, in the process of determining the likelihood function with a penalty, and calculates and determines a statistics value by observing a terrestrial echo only at fine weather as a single echo of the radar return signal, and previously observing a range having no terrestrial echo, in the process of determining the prior distribution.

12. A radar return signal processing method comprising:

detecting an average Doppler frequency, a spectrum width and a received power of each of echoes, from a radar return signal obtained repeatedly at regular intervals using a detector;

estimating an optimum mixed density function by modeling a shape of the frequency spectrum by calculating repeatedly a sum of density functions of each of the echoes using a signal processor; and extracting information on any one of the echoes included in the radar return signal, from a parameter of the estimated mixed density function using the signal processor.

* * * * *